(12) United States Patent
Wen

(10) Patent No.: US 11,750,728 B2
(45) Date of Patent: Sep. 5, 2023

(54) MOBILE TERMINAL AND ELECTRONIC DEVICE

(71) Applicant: GUANGDONG OPPO MOBILE TELECOMMUNICATIONS CORP., LTD., Dongguan (CN)

(72) Inventor: Quanhao Wen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 24 days.

(21) Appl. No.: 17/505,233

(22) Filed: Oct. 19, 2021

(65) Prior Publication Data

US 2022/0038565 A1     Feb. 3, 2022

Related U.S. Application Data

(63) Continuation of application No. PCT/CN2020/080136, filed on Mar. 19, 2020.

(30) Foreign Application Priority Data

Apr. 25, 2019    (CN) .......................... 201920573696.5

(51) Int. Cl.
    *H04M 1/21*          (2006.01)
    *H04N 23/74*        (2023.01)

(52) U.S. Cl.
    CPC .............. *H04M 1/21* (2013.01); *H04N 23/74* (2023.01)

(58) Field of Classification Search
    CPC ...... H04M 1/22; H04M 1/0264; H04M 1/026; H04M 1/0214; H04M 1/0272; H04M 1/21; H04M 1/0283; H04N 23/74
    See application file for complete search history.

(56) References Cited

U.S. PATENT DOCUMENTS

| 2012/0188482 | A1 | 7/2012 | Lee et al. |
| 2012/0236601 | A1 | 9/2012 | Nakakubo |
| 2019/0312964 | A1* | 10/2019 | Haiberger ............... H04M 1/22 |

FOREIGN PATENT DOCUMENTS

| CN | 1499260 A | 5/2004 |
| CN | 1834754 A | 9/2006 |

(Continued)

OTHER PUBLICATIONS

Extended European Search Report dated May 2, 2022 received in European Patent Application No. EP 20794934.8.

(Continued)

*Primary Examiner* — Dung Hong
(74) *Attorney, Agent, or Firm* — Sheppard, Mullin, Richter & Hampton LLP

(57) ABSTRACT

Provided is a mobile terminal, which has a first surface and a second surface that are opposite to each other, and a side peripheral surface connecting the first surface with the second surface. A lens and a light-emitting element are provided within the mobile terminal. The light-emitting element is positioned in the mobile terminal. The lens includes a light-outgoing surface that emits light towards the first surface and/or the second surface. The light emitted from the light-emitting element is capable of exiting from the first surface and/or the second surface through the light-outgoing surface of the lens. An orthographic projection region of the light-emitting element on a reference plane is located outside an orthographic projection region of the light-outgoing surface of the lens on the reference plane. The reference plane is a geometric plane perpendicular to a thickness direction of the mobile terminal.

17 Claims, 11 Drawing Sheets

(56) References Cited

FOREIGN PATENT DOCUMENTS

| | | | | |
|---|---|---|---|---|
| CN | 102352979 | A | 2/2012 | |
| CN | 102955291 | A | 3/2013 | |
| CN | 204005336 | U | 12/2014 | |
| CN | 104977647 | A | 10/2015 | |
| CN | 105570756 | A | 5/2016 | |
| CN | 108712533 | A | 10/2018 | |
| CN | 207968576 | U | 10/2018 | |
| CN | 109479075 | A | 3/2019 | |
| CN | 109479075 | A * | 3/2019 | .......... H04M 1/0202 |
| EP | 2611119 | B1 | 1/2019 | |
| EP | 3438783 | A1 | 2/2019 | |
| JP | 2004037627 | A * | 2/2004 | ....... G02F 1/133615 |
| JP | 2004046050 | A * | 2/2004 | |
| JP | 2004127622 | A * | 4/2004 | |
| JP | 2004311388 | A | 11/2004 | |
| JP | 4098305 | B2 * | 6/2008 | ........... H04N 5/2256 |

OTHER PUBLICATIONS

International Search Report and Written Opinion dated Jun. 18, 2020 in International Application No. PCT/CN2020/080136. English translation attached.

* cited by examiner

MOBILE TERMINAL AND ELECTRONIC DEVICE

CROSS-REFERENCE TO RELATED APPLICATIONS

This application is a continuation of International Application No. PCT/CN2020/080136, filed on Mar. 19, 2020, which claims priority to Chinese Patent Application No. 201920573696.5, filed on Apr. 25, 2019. The disclosures of the aforementioned applications are hereby incorporated by reference in their entireties.

FIELD

The present disclosure relates to the field of electronic devices, and particularly, to a mobile terminal.

BACKGROUND

In current electronic devices such as mobile phones and tablet computers, a light-emitting element such as flash light or fill light is provided in the mobile terminals for a purpose of light-flashing or filling light. The light-emitting element emits light directly to the surface of the mobile terminal, such that the light-emitting element can be observed from the outside of the mobile terminal, which will affect overall aesthetics of an appearance of the mobile terminal.

SUMMARY

In one aspect, the present disclosure provides a mobile terminal. The mobile terminal has a first surface, a second surface opposite to the first surface, and a side peripheral surface connecting the first surface with the second surface. A lens and a light-emitting element are provided within the mobile terminal. The light-emitting element is positioned in the mobile terminal and is surrounded by the first surface, the second surface and the side peripheral surface. The lens includes a light-outgoing surface that emits light towards the first surface, the second surface, or the first surface and the second surface. Light emitted from the light-emitting element is capable of exiting from the first surface, the second surface, or the first surface and the second surface through the light-outgoing surface of the lens. An orthographic projection region of the light-emitting element on a reference plane is located outside an orthographic projection region of the light-outgoing surface of the lens on the reference plane. The reference plane is a geometric plane perpendicular to a thickness direction of the mobile terminal.

In another aspect, the present disclosure provides a mobile terminal. The mobile terminal has a first surface, a second surface opposite to the first surface, and a side peripheral surface connecting the first surface with the second surface. A lens and a light-emitting element are provided within the mobile terminal. The light-emitting element is positioned in the mobile terminal and is surrounded by the first surface, the second surface and the side peripheral surface. Light emitted from the light-emitting element is capable of exiting the mobile terminal from at least one of the first surface and the second surface through the lens.

In yet another aspect, the present disclosure provides an electronic device having a first surface, a second surface opposite to the first surface, and a side peripheral surface connecting the first surface with the second surface. A lens and a light-emitting element are provided within the electronic device. The light-emitting element is positioned in the electronic device and is surrounded by the first surface, the second surface and the side peripheral surface. The lens includes a light-outgoing surface that emits light towards the first surface, the second surface, or the first surface and the second surface, light emitted from the light-emitting element is capable of exiting from the first surface, the second surface, or the first surface and the second surface through the light-outgoing surface of the lens. An orthographic projection region of the light-emitting element on a reference plane is located outside an orthographic projection region of the light-outgoing surface of the lens on the reference plane. The reference plane is a geometric plane perpendicular to a thickness direction of the electronic device.

BRIEF DESCRIPTION OF DRAWINGS

In order to clearly explain technical solutions of embodiments of the present disclosure or in the related art, drawings used in the description of the embodiments or in the related art are briefly described below. Obviously, the drawings described below are merely some embodiments of the present disclosure. Based on these drawings, other drawings can be obtained by those skilled in the art without paying creative efforts.

DESCRIPTION OF EMBODIMENTS

In order to facilitate the understanding of the present disclosure, the present disclosure will be described comprehensively below with reference to the accompanying drawings. The accompanying drawings illustrate preferred embodiments of the present disclosure. However, the present disclosure can be implemented in many different forms and is not limited to the embodiments described herein. On the contrary, these embodiments are provided to facilitate a thorough and comprehensive understanding of the content of the present disclosure.

The "terminal device" used herein includes, but is not limited to, a device configured to receive and/or transmit communication signals via any one or more of the following connections:

(1) via a wired line connection, such as via a Public Switched Telephone Network (PSTN), a Digital Subscriber Line (DSL), a digital cable, and a direct cable connection; and (2) via a wireless interface, for example, a cellular network, a Wireless Local Area Network (WLAN), a digital television network such as a Digital Video Broadcasting-Handheld (DVB-H) network, a satellite network, and an Amplitude Modulation-Frequency Modulation (AM-FM) broadcast transmitter.

A terminal device configured to communicate through the wireless interface may be referred to as a "mobile terminal". Examples of the mobile terminal include, but are not limited to, the following electronic devices:

(1) a satellite phone or a cellular phone;

(2) a Personal Communication System (PCS) terminal that can combine a cellular radiotelephone with capabilities such as data processing, facsimile and data communication;

(3) a radiotelephone, a pager, an Internet/Intranet access, a Web browser, a notepad, a calendar, and a Personal Digital Assistant (PDA) equipped with a Global Positioning System (GPS) receiver;

(4) a conventional laptop and/or palmtop receiver; and (5) a conventional laptop and/or palmtop radiotelephone transceiver, etc.

Figure 1:
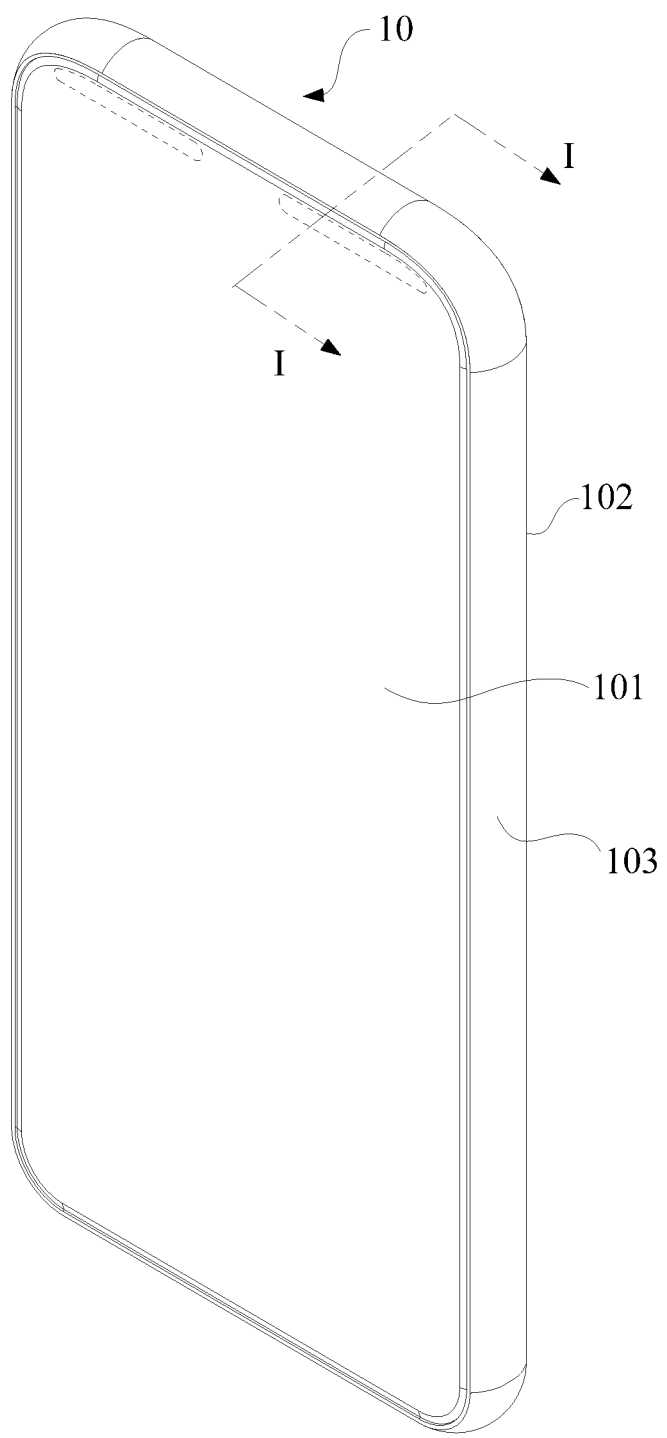
FIG. 1 is a three-dimensional schematic diagram of a mobile terminal according to an embodiment.

Referring to FIG. 1, the present disclosure provides a mobile terminal 10. The mobile terminal 10 may be a smart phone, a computer, or an IPAD, etc., which is not specifically limited herein.

A terminal device may be referred to as an "electronic device". Examples of the electronic device include, but are not limited to, a television, an on-board display, a master control display, and a car display.

The mobile terminal 10 according to this embodiment is described by taking a mobile phone as an example. The mobile terminal 10 has a first surface 101, a second surface 102 opposite to the first surface 101, and a side peripheral surface connecting the first surface 101 with the second surface 102.

Figure 2:
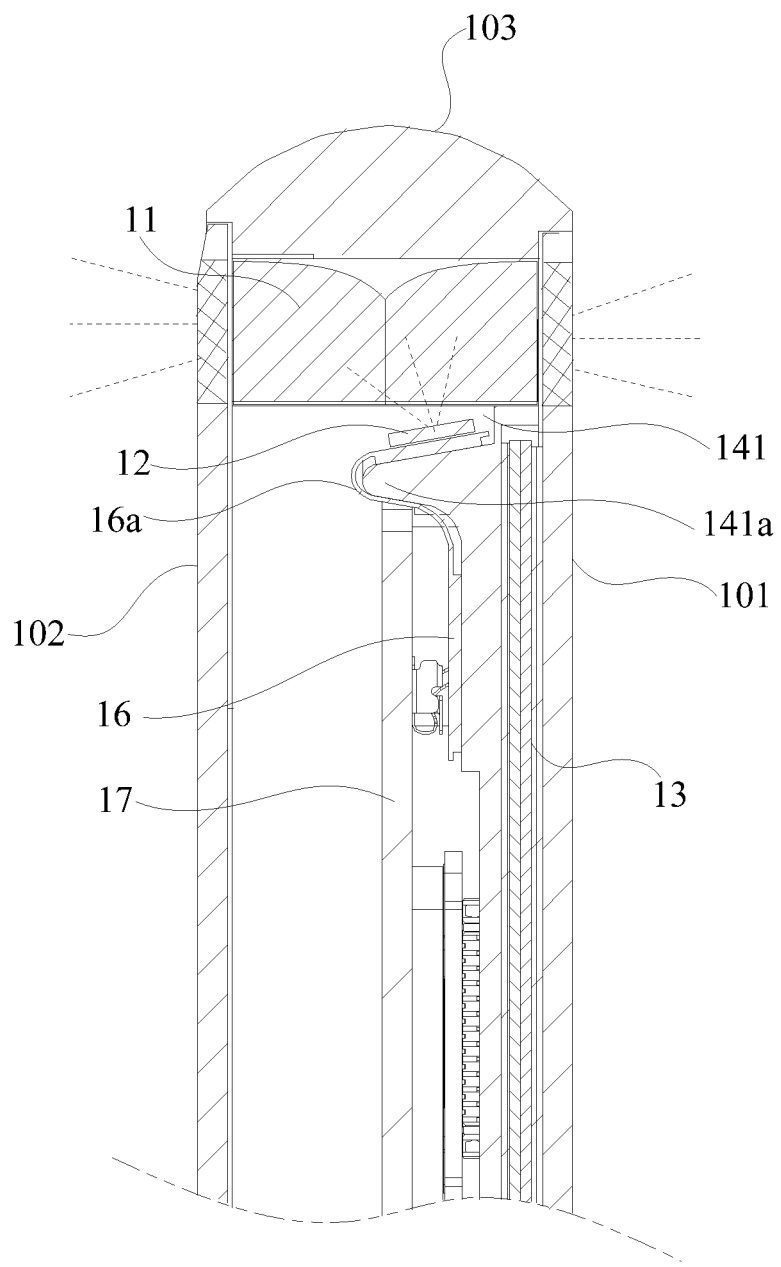
FIG. 2 is a partial cross-sectional view of a mobile terminal illustrated in FIG. 1 taken along a line I-I.

As illustrated in FIG. 2, a lens 11 and a light-emitting element 12 are provided within the mobile terminal 10. The light-emitting element 12 is positioned in the mobile terminal 10 and is surrounded by the first surface 101, the second surface 102 and the side peripheral surface. The light-emitting element 12 cannot be seen from the outside of the mobile terminal 10. In this embodiment, the lens 11 can change a propagation direction of light emitted from the light-emitting element 12, such that the light is capable of exiting from the mobile terminal 10. Specifically, the lens 11 includes a light-outgoing surface that emits light towards the first surface 101 and/or the second surface 102, such that the light emitted from the light-emitting element 12 is capable of exiting from the first surface 101 and/or the second surface 102 through the light-outgoing surface of the lens 11. A distance between the first surface 101 and the second surface 102 is defined as a thickness of the mobile terminal 10. A geometric plane perpendicular to a thickness direction of the mobile terminal 10 is defined as a reference plane. An orthographic projection region of the light-emitting element 12 on the reference plane is located outside an orthographic projection region of the light-outgoing surface of the lens 11 on the reference plane.

In this embodiment, the lens 11 can change the propagation direction of the light emitted from the light-emitting element 12, and the light can exit the mobile terminal 10 from the first surface 101 and/or the second surface 102, such that the light-emitting element 12 can be used as a flash light and/or a fill light. The lens 11 serves as a medium for the light traveling from the inside of the mobile terminal 10 to the outside. The lens 11 uses the light-outgoing surface to emit the light towards the first surface 101 and/or the second surface 102. Since the orthographic projection region of the light-outgoing surface of the light-emitting element 12 on the reference plane is located outside the orthographic projection region of the lens 11 on the reference plane, when observing from a side where the light-outgoing surface of the lens 11 is located, i.e., observing from a side where the first surface 101 or the second surface 102 is located, the light-outgoing surface of the light-emitting element 12 is staggered with and does not overlap the lens 11. In this way, the light-emitting element 12 cannot be observed through the lens 11 from a light-outgoing side of the lens 11, which is advantageous for hiding the light-emitting element 12 in the mobile terminal 10, thereby preventing the light-emitting element 12 from being observed from the outside of the mobile terminal 10, and improving the overall aesthetics of the appearance of the mobile terminal 10.

The lens 11 has various structural forms, in order to transmit the light of the light-emitting element 12 out of the mobile terminal 10. For example, the lens 11 can be made of a material having a good light guide property, e.g., optical Poly Carbonate (PC), or acrylic. When the light emitted from the light-emitting element 12 irradiates the lens 11, the lens 11 guides the light out of the mobile terminal 10.

It should be noted that, as a surface from which the lens 11 emits the light, one or a plurality of light-outgoing surfaces can be provided. For example, in some embodiments, the light-outgoing surface can be divided into two surfaces facing the first surface 101 and the second surface 102, respectively, to achieve a double-sided light-outgoing effect.

Figure 3:
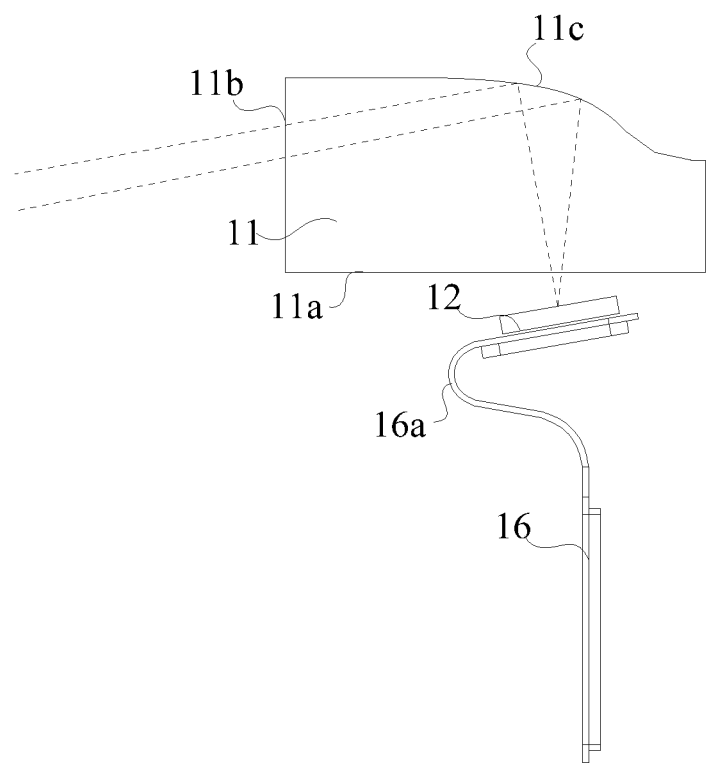
FIG. 3 is a schematic diagram of optical paths and structures of a light-emitting element and a lens in a mobile terminal according to an embodiment.

As illustrated in FIG. 3, the lens 11 includes a light-incident surface 11a. The light-outgoing surface of the lens 11 includes a first light-emergent surface 11b. An included angle is formed between the light-incident surface 11a and the first light-emergent surface 11b. The light is capable of entering the lens 11 through the light-incident surface 11a and exiting from the first light-emergent surface 11b.

The lens 11 includes a first light-reflecting surface 11c. The first light-reflecting surface 11c faces towards the light-incident surface 11a and is capable of reflecting the light to the first light-emergent surface 11b.

Figure 4:
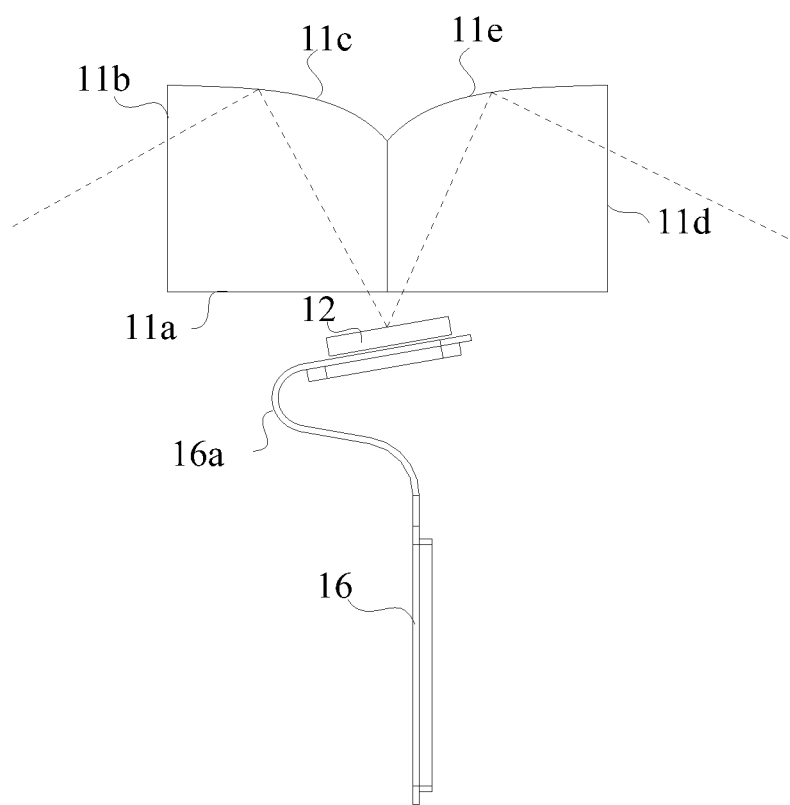
FIG. 4 is a schematic diagram of optical paths and structures of a light-emitting element and a lens in a mobile terminal according to another embodiment.

In some embodiments, as illustrated in FIG. 4, the light-outgoing surface of the lens 11 further includes a second light-emergent surface 11d opposite to the first light-emergent surface 11b. A part of the light emitted from the light-emitting element 12 passes through the lens 11 and exits from the first light-emergent surface 11b, and another part of the light emitted from the light-emitting element 12 passes through the lens 11 and exits from the second light-emergent surface 11d. Therefore, the lens 11 is arranged within the mobile terminal 10 and can satisfy a requirement that the light exits in two directions respectively through the first light-emergent surface 11b and the second light-emergent surface 11d, thereby satisfying light-outgoing requirements of the first surface 101 and the second surface 102.

With continued reference to FIG. 4, the lens 11 further includes a second light-reflecting surface 11e facing towards the light-incident surface 11a and capable of reflecting the light to the second light-emergent surface 11d.

An orthographic projection region of the second light-reflecting surface 11e on the light-incident surface 11a partially overlaps an orthographic projection region of the first light-reflecting surface 11c on the light-incident surface 11a, or the orthographic projection of the second light-reflecting surface 11e on the light-incident surface 11a coincides with a part of an edge of the orthographic projection region of the first light-reflecting surface 11c on the light-incident surface 11a. The light-emitting element 12 is arranged at a position where the first light-reflecting surface 11c and the second light-reflecting surface 11e meet. In this way, after the light emitted from the light-emitting element 12 enters the lens 11 from the light-incident surface 11a, a part of the light is incident on the first light-reflecting surface 11c and exits from the first light-emergent surface 11b, and a part of the light is incident on the second light-reflecting surface 11e and exits from the second light-emergent surface 11d. When the lens 11 is mounted on the mobile terminal 10, the lens 11 with such a structure can meet a requirement of emitting light towards the first surface 101 and the second surface 102.

It should be noted that the first surface 101 may be a side surface of the mobile terminal 10 where a display screen 13 is provided, while the second surface 102 may be a side surface facing away from the display screen 13.

The light-emitting element 12 can be a Light Emitting Diode (LED) light bead, which can emit blue, red or green light. A color of the light emitted from the light-emitting element 12 is not specifically limited herein.

In some embodiments, the display screen 13 may be a Liquid Crystal Display (LCD) screen for displaying information. The LCD screen may be a Thin Film Transistor (TFT) screen, or an In-Plane Switching (IPS) screen, or a Splice Liquid Crystal Display (SLCD) screen.

In other embodiments, the display screen 13 may be an Organic Light-Emitting Diode (OLED) screen for displaying information. The OLED screen may be an Active-Matrix Organic Light Emitting Diode (AMOLED) screen, or a Super AMOLED screen, or a Super AMOLED Plus screen, which is not specifically limited herein.

As an example, a structure of the mobile terminal 10 will be further described below by taking the first surface 101 as the side surface of the mobile terminal 10 where the display screen 13 is provided.

Figure 5:
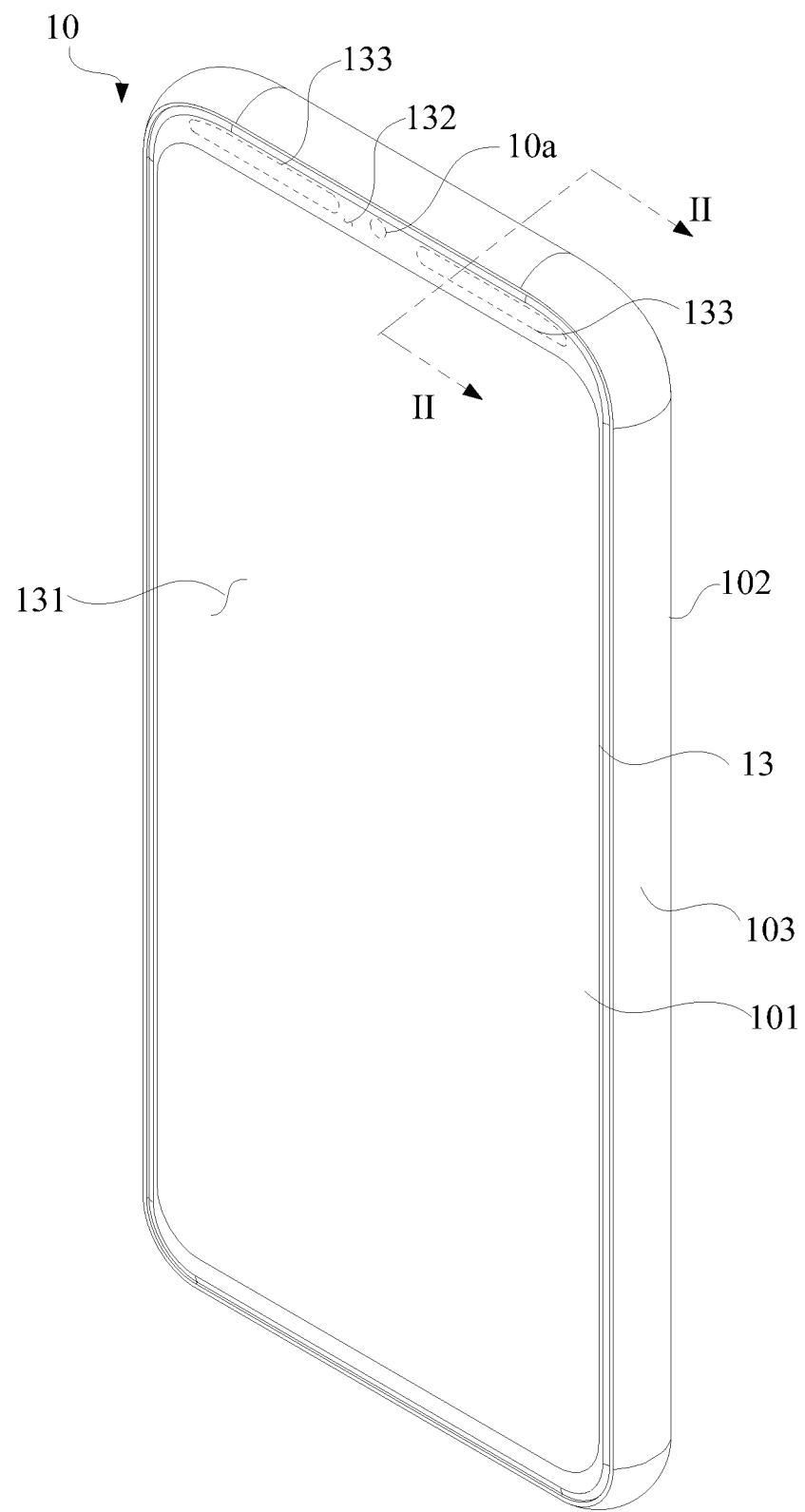
FIG. 5 is a three-dimensional schematic diagram of a mobile terminal according to another embodiment.
Figure 6:
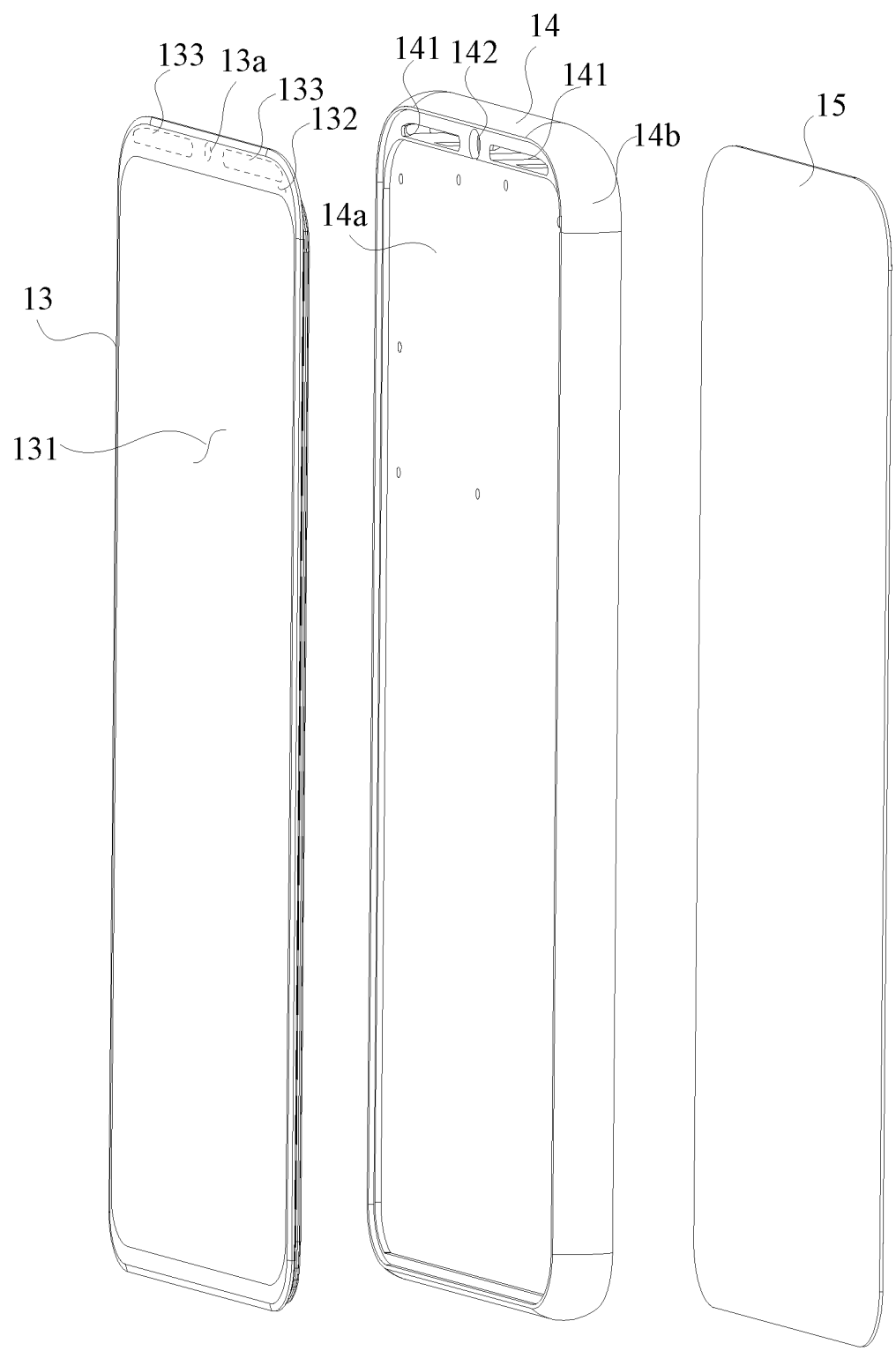
FIG. 6 is an exploded schematic diagram of a partial structure of a mobile terminal illustrated in FIG. 5.

As illustrated in FIG. 5 and FIG. 6, the mobile terminal 10 includes a display screen 13, a middle frame 14, and a rear housing 15.

The display screen 13 includes a displayable region 131 facing towards a side where the first surface 101 is located. In other words, the displayable region 131 is located at a side of the display screen 13 facing towards the first surface 101. The middle frame 14 is connected to a side of the display screen 13 facing away from the displayable region 131. The second surface 102 is at least partially located on the rear housing 15. The rear housing 15 is connected to a side of the middle frame 14 facing away from the display screen 13.

The middle frame 14 includes a middle plate 14a and a peripheral frame 14b. The peripheral frame 14b is connected to a peripheral side of the middle plate 14a. A mounting slot 141 is defined in the peripheral frame 14b. The lens 11 is mounted in the mounting slot 141. Therefore, when the display screen 13 and the rear housing 15 are connected to the middle frame 14, the lens 11 is fixed by the peripheral frame 14b to be located between the display screen 13 and the rear housing 15.

Figure 9:
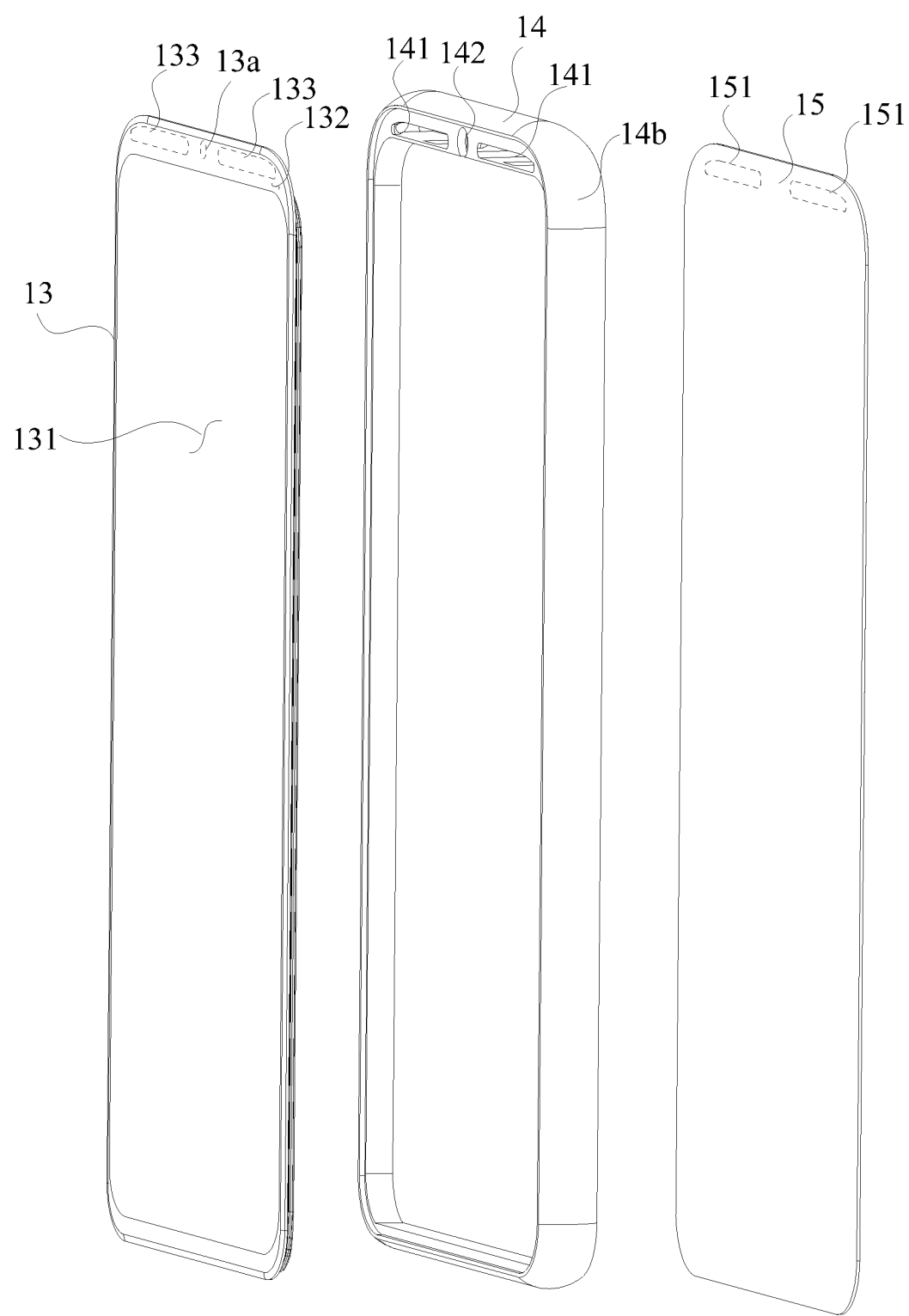
FIG. 9 is an exploded schematic diagram of a partial structure of a mobile terminal illustrated in FIG. 8.

As illustrated in FIG. 9, the middle plate 14a of the middle frame 14 can be omitted.

In some embodiments, the peripheral frame 14b and the rear housing 15 are formed as one piece.

In an embodiment where the lens 11 emits the light towards the first surface 101, the display screen 13 located on the side where the first surface 101 is located is provided with a structure for allowing the light to pass through.

Figure 7:
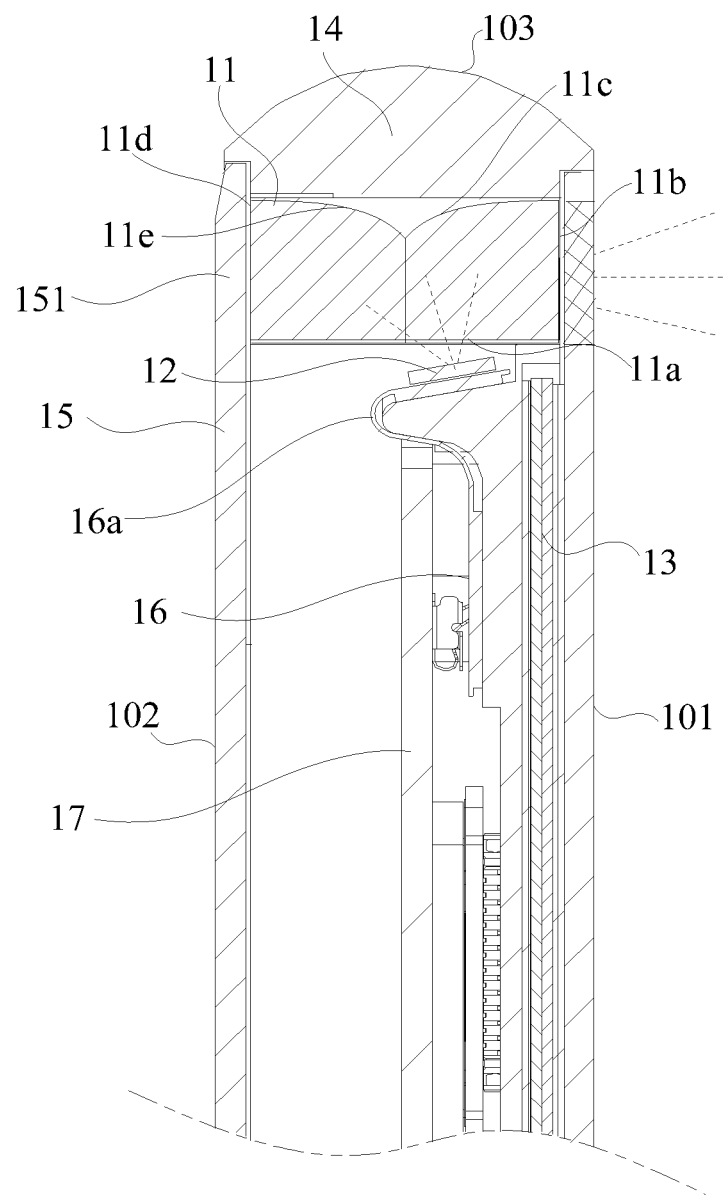
FIG. 7 is a partial cross-sectional view of a mobile terminal illustrated in FIG. 5 taken along a line II-II.

With continued reference to FIG. 5 to FIG. 7, the display screen 13 includes a non-display region 132 located outside the displayable region 131, a light-transmitting region 133 is provided in the non-display region 132 of the display screen 13, and the light emitted from the light-emitting element 12 is capable of passing through the lens 11 and exiting from the light-transmitting region 133.

In an embodiment where the light-outgoing surface of the lens 11 merely includes the first light-emergent surface 11b, the first light-emergent surface 11b faces the light-transmitting region 133. The light exiting from the first light-emergent surface 11b can pass through the light-transmitting region 133, so as to exit the mobile terminal 10 from the side where the first surface 101 is located.

In some embodiments, the rear housing 15 is made of an opaque material. In a case that the light-outgoing surface of the lens 11 includes the first light-emergent surface 11b and the second light-emergent surface 11d, the light exiting from the lens 11 can only travel out of the mobile terminal 10 through the light-transmitting region 133 due to the opacity of the rear housing 15. That is, the light exiting from the lens 11 travels out of the mobile terminal 10 from the side where the first surface 101 is located. With such a structure, when a front camera 10a facing towards the side of the display screen 13 works, the light emitted from the light-emitting element 12 travels out of the mobile terminal 10 from the first surface 101 through the lens 11, which can provide a light filling effect.

It should be noted that, the front camera 10a is provided within the mobile terminal 10, the non-display region 132 of the display screen 13 is provided with a light-passing region 13a for allowing external light to enter the front camera 10a, a light-passing hole 142 is defined in a corresponding position of the peripheral frame 14b, and the lens of the front camera 10a faces the light-passing hole 142, such that the external light can enter the front camera 10a through the light-passing region 13a and the light-passing hole 142, thereby meeting photographic requirements.

The light-passing region 13a and the light-transmitting region 133 can be flexibly positioned, as long as the mounting of the front camera 10a does not interfere with an arrangement of the structures such as the lens 11 or the light-emitting element 12. In addition, a plurality of light-transmitting regions 133 can be provided, and accordingly, a plurality of lenses 11 and a plurality of light-emitting elements 12 may be provided to meet needs of light filling or light flashing during shooting.

In some embodiments, the mounting slot 141 penetrates the peripheral frame 14b along the thickness direction of the mobile terminal 10. In this way, the lens 11 arranged in the mounting slot 141 may be exposed to both the side where the first surface 101 is located and the side where the second surface 102 is located. Specifically, when the lens 11 emits the light towards the first surface 101 and the second surface 102, the middle frame 14 does not shield the light traveling towards the first surface 101 and the second surface 102.

Figure 8:
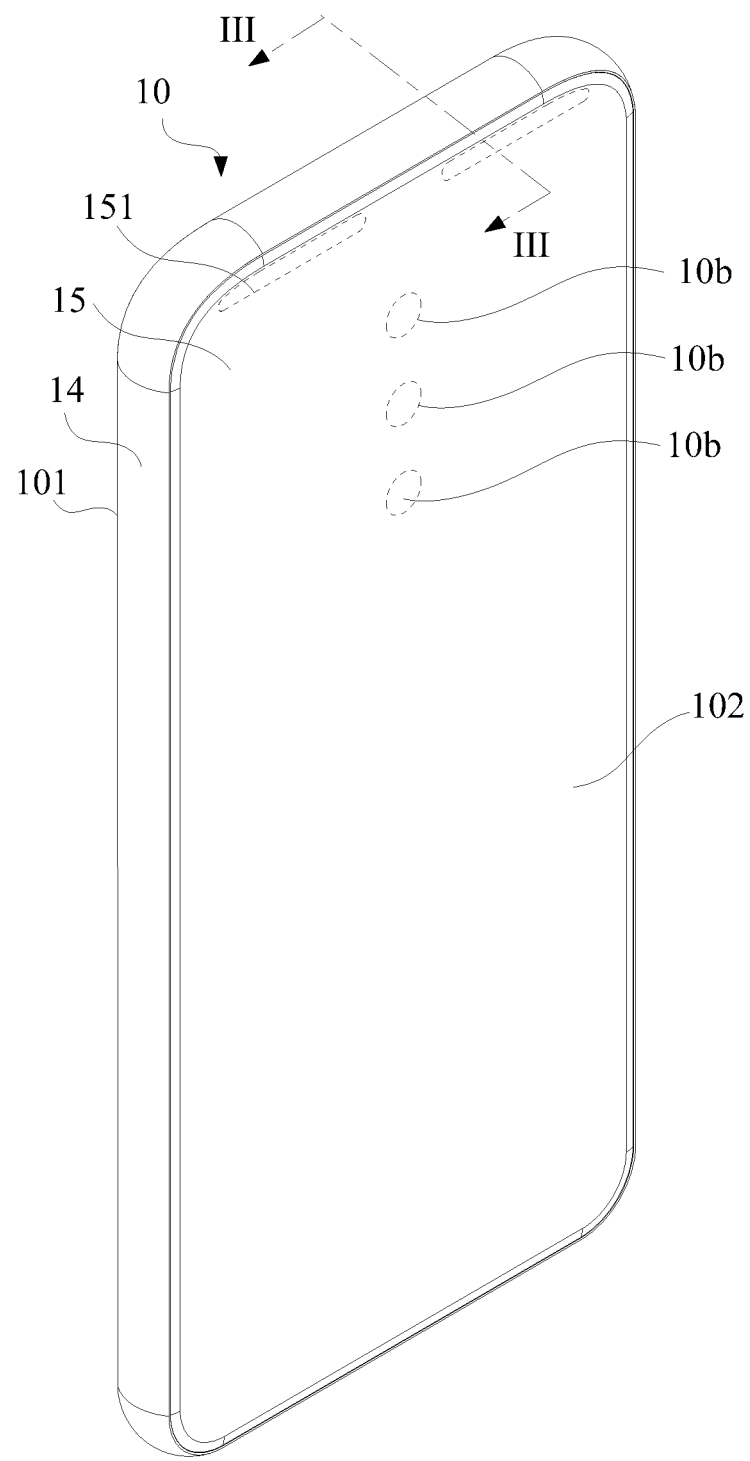
FIG. 8 is a three-dimensional schematic diagram of a mobile terminal according to yet another embodiment.

As illustrated in FIG. 8 and FIG. 9, in some embodiments, the rear housing 15 is made of a transparent material, and the light emitted from the light-emitting element 12 is capable of passing through the lens 11 and traveling out of the rear housing 15. In other embodiments, the rear housing 15 is provided with a light-transmitting member 151. The light emitted from the light-emitting element 12 is capable of passing through the lens 11 and traveling out of the rear housing 15 through the light-transmitting member 151. The light-transmitting member 151 and the rear housing 15 can be formed as one piece to form a light-transmitting region on the rear housing 15.

When a rear camera 10b is used to photograph, after the propagation direction of the light emitted from the light-emitting element 12 is changed by the lens 11, the light exits from the side where the rear housing 15 is located, thereby achieving a light-flashing effect.

Figure 10:
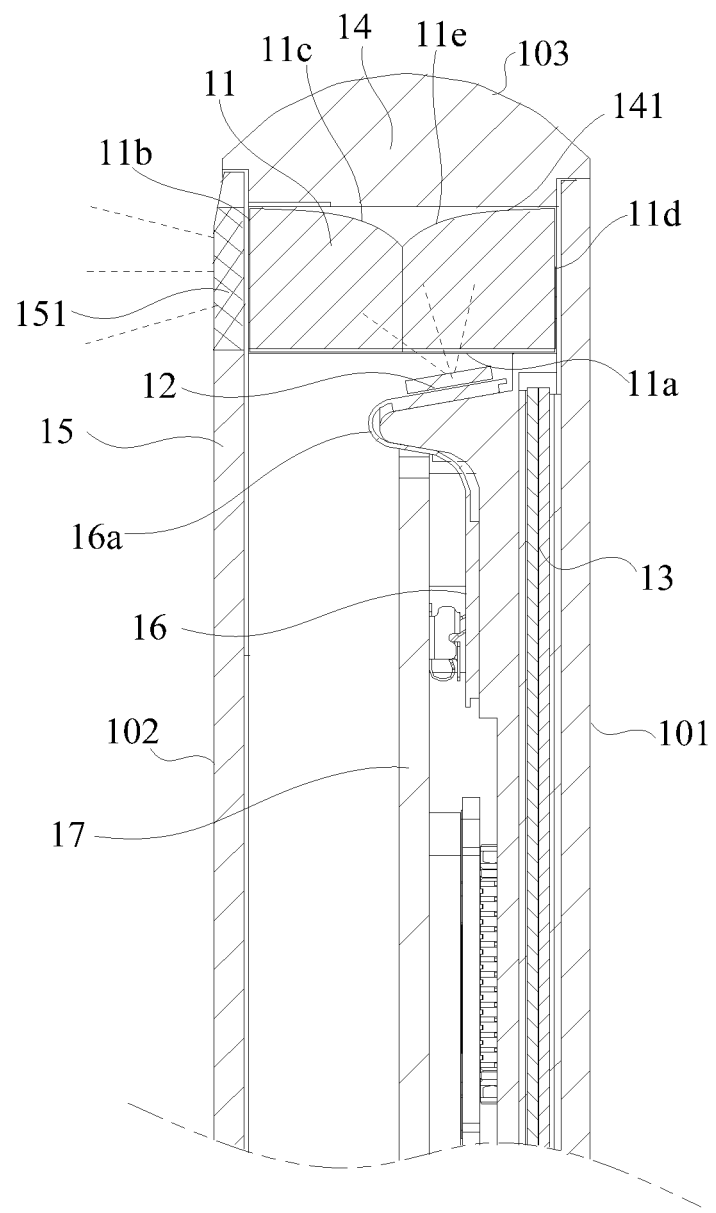
FIG. 10 is a partial cross-sectional view of a mobile terminal illustrated in FIG. 8 taken along a line III-III.

As illustrated in FIG. 10, in some embodiments, the display screen 13 can provide a light-shielding effect, such that the light exiting from the lens 11 cannot travel out of the mobile terminal 10 from the side where the first surface 101 is located.

Figure 11:
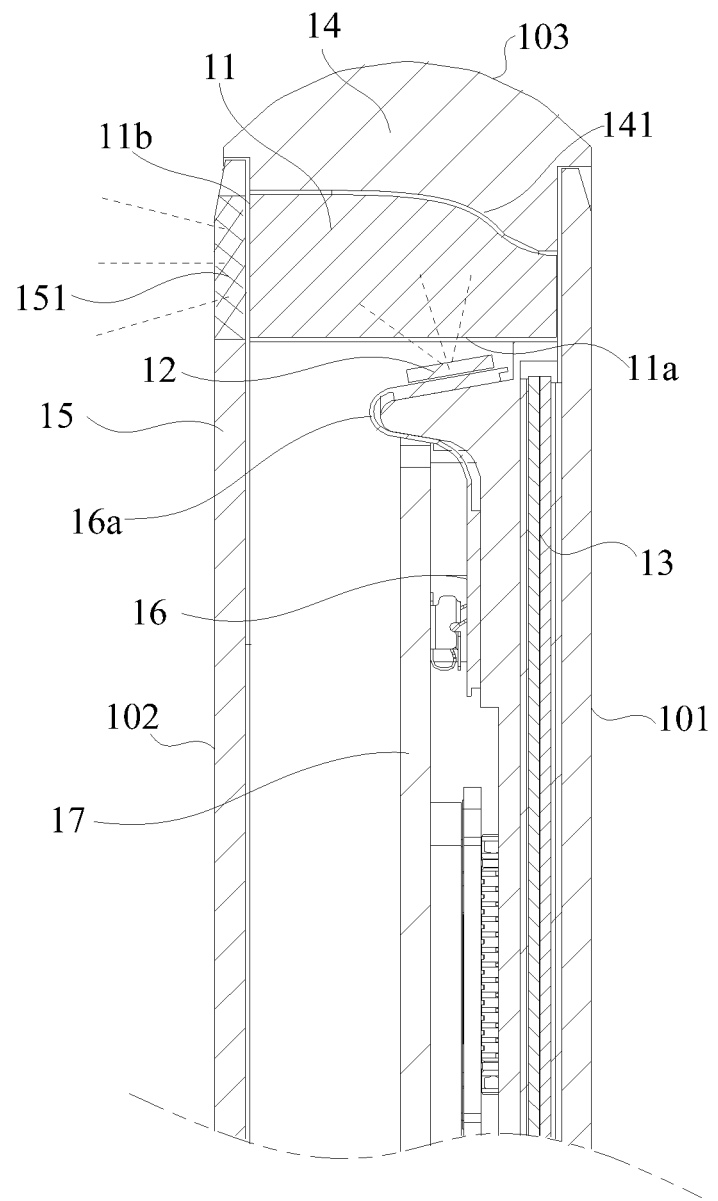
FIG. 11 is a cross-sectional view of a partial structure of a mobile terminal according to another embodiment.

In other embodiments, the structure of the lens 11 can also be configured in such a manner such that the lens 11 includes only one light-emergent surface. By adjusting an arrangement position of the lens 11 to change an orientation of the first light-emergent surface 11b, and by adaptably providing the light-transmitting member 151 or the light-transmitting region 133 on the side where the first surface 101 or the second surface 102 is located for transmitting light, it is also possible to achieve that the light exits from only one of the first surface 101 and the second surface 102. For example, in combination with the mobile terminal 10 illustrated in FIG. 11, the lens 11 includes only the first light-emergent surface 11b as the light-outgoing surface. That is, the light-outgoing surface of the lens only includes the first light-emergent surface 11b. Specifically, the light emitted from the light-emitting element 12 only exits from the first light-emergent surface 11b after entering the lens 11 through the light-incident surface 11a. With such an arrangement, when the light-transmitting member 151 is provided on the rear housing 15 and faces the first light-emergent surface 11b, the light exiting from the first light-emergent surface 11b is capable of traveling out of the rear housing 15 through the light-transmitting member 151. In this way, the light-emitting element 12 can be used as a flash light, which is flashing when the rear camera 10b is shooting.

As illustrated in FIG. 2 to FIG. 4, in some embodiments, the mobile terminal 10 further includes a main board 17. The light-emitting element 12 is connected to the main board 17 through a Flexible Printed Circuit (FPC) board 16. The FPC board 16 has a bending section 16a arranged close to the light-emitting element 12 and attached to a side wall 141a of the mounting slot 141.

Figure 12:
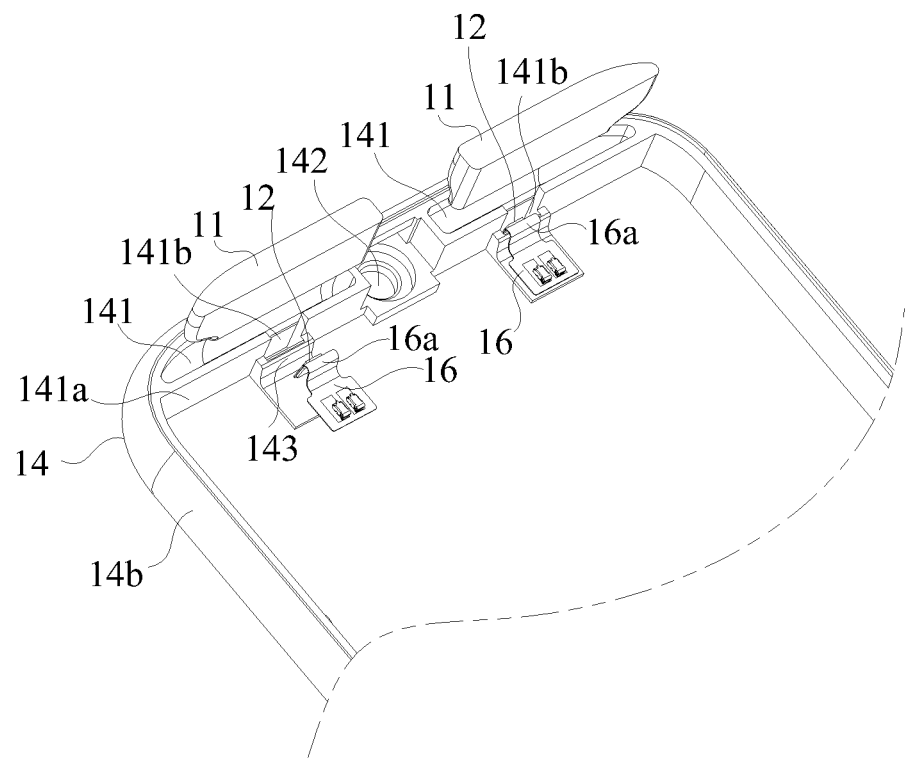
FIG. 12 is an exploded schematic diagram of a partial structure of a mobile terminal according to an embodiment.

In other embodiments, as illustrated in FIG. 12, the mobile terminal 10 includes the main board 17. The light-emitting element 12 is connected to the main board 17 through the FPC board 16. A notch 141b is defined in the side wall 141a of the mounting slot 141. A protruding rib 143 is connected to the side wall 141a. The FPC board 16 has a bending section 16a arranged close to the light-emitting element 12. The bending section 16a is attached to the protruding rib 143. A part or all of a structure of the light-emitting element 12 is accommodated in the notch 141b. In this way, an internal structure of the mobile terminal 10 is more compact.

Figure 13:
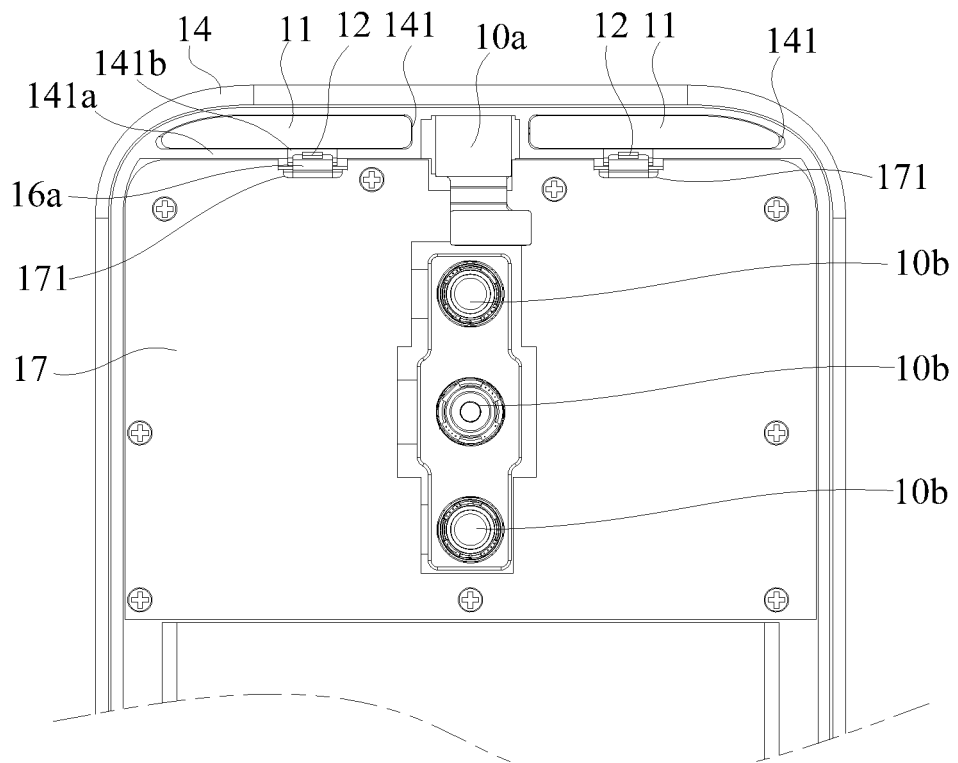
FIG. 13 is a schematic diagram of a partial assembly of a mobile terminal according to an embodiment.

In some embodiments, as illustrated in FIG. 13, an avoidance slot 171 is defined in the main board 17, and the structure of the bending section 16a is partially or completely accommodated in the avoidance slot 171, such that the internal structure of the mobile terminal 10 is more compact, conducive to a light-weight and thin design of the mobile terminal 10.

Technical features in the above embodiments can be combined arbitrarily. All the possible combinations of the technical features in the above embodiments are not described for the purpose of concise description. However, as long as there is no conflict between the technical features in the embodiments, any combinations of technical features in the above embodiments should be considered as falling within the scope of the present disclosure.

The above embodiments illustrate merely some implementations of the present disclosure, and they are described in detail. However, the above embodiment should not be construed as limitations on the scope of the present disclosure. It should be understood that, without departing from the concept of the present disclosure, those skilled in the art are able to make various modifications and improvements, which shall fall within the protection scope of the present disclosure. Therefore, the protection scope of the present disclosure shall be defined by the appended claims.

What is claimed is:

1. A mobile terminal having a first surface, a second surface opposite to the first surface, and a side peripheral surface connecting the first surface with the second surface,
    wherein a lens and a light-emitting element are provided within the mobile terminal, the light-emitting element is positioned in the mobile terminal and is surrounded by the first surface, the second surface and the side peripheral surface, the lens comprises a light-outgoing surface that emits light towards the first surface, the second surface, or the first surface and the second surface, light emitted from the light-emitting element is capable of exiting from the first surface, the second surface, or the first surface and the second surface through the light-outgoing surface of the lens, an orthographic projection region of the light-emitting element on a reference plane is located outside an orthographic projection region of the light-outgoing surface of the lens on the reference plane, and the reference plane is a geometric plane perpendicular to a thickness direction of the mobile terminal;
    wherein the lens further comprises a light-incident surface, the light-outgoing surface of the lens comprises a first light-emergent surface, an included angle is formed between the light-incident surface and the first light-emergent surface, and the light is capable of entering the lens through the light-incident surface and exiting from the first light-emergent surface; and
    wherein the lens further comprises a first light-reflecting surface, and the first light-reflecting surface faces towards the light-incident surface and is capable of reflecting the light to the first light-emergent surface.

2. The mobile terminal according to claim 1, wherein the light-outgoing surface of the lens further comprises a second light-emergent surface opposite to the first light-emergent surface, a part of the light emitted from the light-emitting element is capable of passing through the lens and exiting from the first light-emergent surface, and another part of the light emitted from the light-emitting element is capable of passing through the lens and exiting from the second light-emergent surface.

3. The mobile terminal according to claim 2, wherein the lens further comprises a first light-reflecting surface facing towards the light-incident surface and capable of reflecting the light to the first light-emergent surface, and a second light-reflecting surface facing towards the light-incident surface and capable of reflecting the light to the second light-emergent surface, and wherein an orthographic projection region of the second light-reflecting surface on the light-incident surface partially overlaps an orthographic projection region of the first light-reflecting surface on the light-incident surface.

4. The mobile terminal according to claim 2, wherein the lens further comprises a first light-reflecting surface facing towards the light-incident surface and capable of reflecting the light to the first light-emergent surface, and a second light-reflecting surface facing towards the light-incident surface and capable of reflecting light to the second light-emergent surface, and wherein an orthographic projection of the second light-reflecting surface on the light-incident surface coincides with a part of an edge of an orthographic projection region of the first light-reflecting surface on the light-incident surface.

5. The mobile terminal according to claim 1, comprising a display screen, a middle frame, and a rear housing, wherein the display screen comprises a displayable region facing towards a side where the first surface is located, the middle frame is connected to a side of the display screen facing away from the displayable region, the second surface is at least partially located on the rear housing, the rear housing is connected to a side of the middle frame facing away from the display screen, the middle frame comprises a peripheral frame, a mounting slot is defined in the peripheral frame, and the lens is mounted in the mounting slot.

6. The mobile terminal according to claim 5, wherein the display screen further comprises a non-display region located outside the displayable region, a light-transmitting region is provided in the non-display region of the display screen, and the light emitted from the light-emitting element is capable of passing through the lens and exiting from the light-transmitting region.

7. The mobile terminal according to claim 5, wherein the rear housing is made of a transparent material, and the light emitted from the light-emitting element is capable of passing through the lens and traveling out of the rear housing.

8. The mobile terminal according to claim 5, wherein the rear housing is provided with a light-transmitting member, and the light emitted from the light-emitting element is capable of passing through the lens and traveling out of the rear housing through the light-transmitting member.

9. The mobile terminal according to claim 5, wherein the mounting slot penetrates the peripheral frame along the thickness direction of the mobile terminal.

10. The mobile terminal according to claim 5, further comprising a main board, wherein the light-emitting element is connected to the main board through a Flexible Printed Circuit (FPC) board, the FPC board has a bending section arranged close to the light-emitting element and attached to a side wall of the mounting slot.

11. The mobile terminal according to claim 5, further comprising a main board, wherein the light-emitting element is connected to the main board through a Flexible Printed Circuit (FPC) board, a notch is defined in a side wall of the mounting slot, a protruding rib is connected to the side wall, the FPC board has a bending section arranged close to the light-emitting element, the bending section is attached to the protruding rib, and a part or an entirety of a structure of the light-emitting element is accommodated in the notch.

12. The mobile terminal according to claim 11, wherein an avoidance slot is defined in the main board, and a part of a structure of the bending section is accommodated in the avoidance slot.

13. The mobile terminal according to claim 11, wherein an avoidance slot is defined in the main board, and an entirety of a structure of the bending section is accommodated in the avoidance slot.

14. A mobile terminal having a first surface and a second surface opposite to the first surface, and a side peripheral surface connecting the first surface with the second surface, wherein a lens and a light-emitting element are provided within the mobile terminal, the light-emitting element is positioned in the mobile terminal and is surrounded by the first surface, the second surface and the side peripheral surface, and light emitted from the light-emitting element is capable of exiting the mobile terminal from at least one of the first surface and the second surface through the lens; and wherein the lens comprises a light-incident surface, a first light-emergent surface, and a first light-reflecting surface facing towards the light-incident surface and capable of reflecting light to the first light-emergent surface, wherein an included angle is formed between the light-incident surface and the first light-emergent surface, and the light is capable of entering the lens through the light-incident surface and exiting from the first light-emergent surface.

15. The mobile terminal according to claim 14, wherein the lens further comprises a second light-emergent surface opposite to the first light-emergent surface, a part of the light emitted from the light-emitting element is capable of passing through the lens and exiting from the first light-emergent surface, and another part of the light emitted from the light-emitting element is capable of passing through the lens and exiting from the second light-emergent surface.

16. The mobile terminal according to claim 14, comprising a display screen and a middle frame, wherein the display screen comprises a displayable region facing towards a side where the first surface is located, the middle frame is connected to a side of the display screen facing away from the displayable region, and the lens is mounted in the middle frame.

17. An electronic device, having a first surface, a second surface opposite to the first surface, and a side peripheral surface connecting the first surface with the second surface, wherein a lens and a light-emitting element are provided within the electronic device, the light-emitting element is positioned in the electronic device and is surrounded by the first surface, the second surface and the side peripheral surface, the lens comprises a light-outgoing surface that emits light towards the first surface, the second surface, or the first surface and the second surface, light emitted from the light-emitting element is capable of exiting from the first surface, the second surface, or the first surface and the second surface through the light-outgoing surface of the lens, an orthographic projection region of the light-emitting element on a reference plane is located outside an orthographic projection region of the light-outgoing surface of the lens on the reference plane, and the reference plane is a geometric plane perpendicular to a thickness direction of the electronic device;

wherein the lens further comprises a light-incident surface, the light-outgoing surface of the lens comprises a first light-emergent surface, an included angle is formed between the light-incident surface and the first light-emergent surface, and the light is capable of entering the lens through the light-incident surface and exiting from the first light-emergent surface; and wherein the lens further comprises a first light-reflecting surface, and the first light-reflecting surface faces towards the light-incident surface and is capable of reflecting the light to the first light-emergent surface.

* * * * *